(12) United States Patent
Baba et al.

(10) Patent No.: US 9,230,418 B2
(45) Date of Patent: Jan. 5, 2016

(54) PORTABLE DEVICE

(71) Applicant: TOYODA GOSEI CO., LTD., Kiyosu-shi, Aichi-ken (JP)

(72) Inventors: Kazumasa Baba, Kiyosu (JP); Hiromitsu Takeuchi, Kiyosu (JP); Tamotsu Sasada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 44 days.

(21) Appl. No.: 14/302,956

(22) Filed: Jun. 12, 2014

(65) Prior Publication Data

US 2014/0377595 A1   Dec. 25, 2014

(30) Foreign Application Priority Data

Jun. 24, 2013  (JP) .................. 2013-131813

(51) Int. Cl.
| | | |
|---|---|---|
| *G02B 6/00* | (2006.01) | |
| *G08B 6/00* | (2006.01) | |
| *H04M 19/04* | (2006.01) | |
| *G04B 25/02* | (2006.01) | |
| *H01M 2/10* | (2006.01) | |

(52) U.S. Cl.
CPC  *G08B 6/00* (2013.01); *G04B 25/02* (2013.01); *H01M 2/1066* (2013.01); *H04M 19/047* (2013.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 2002/0142701 A1* | 10/2002 | Rosenberg | ............. | G05D 1/005 446/454 |
| 2011/0188177 A1* | 8/2011 | Klevermand | ........... | G06F 3/041 361/679.01 |
| 2013/0207524 A1* | 8/2013 | Baba | ....................... | A61F 2/588 310/348 |

FOREIGN PATENT DOCUMENTS

JP         2013-62747 A      4/2013

\* cited by examiner

*Primary Examiner* — Patrick Ryan
*Assistant Examiner* — Wyatt McConnell
(74) *Attorney, Agent, or Firm* — Posz Law Group, PLC

(57) ABSTRACT

A portable device includes a case having wall portions, a battery arranged within the case, and a polymer membrane arranged between at least one of the wall portions and the battery. The polymer membrane couples the battery to the at least one of the wall portions. The polymer membrane has a property of elastically changing at least one of the thickness and the length in a planar direction by being deformed in response to voltage application and restoring its original shape in response to the stoppage of the voltage application. The battery is caused to reciprocate by applying a voltage that changes periodically to the polymer membrane.

8 Claims, 3 Drawing Sheets

PORTABLE DEVICE

BACKGROUND OF THE INVENTION

The present invention relates to a portable device having a vibration generating mechanism.

Many portable devices such as mobile phones are equipped with a vibrator, which is a vibration generating mechanism for announcing an incoming call, an alarm (set time) or the like. In general, the vibrator has a structure in which a weight is eccentrically fixed to the rotary shaft of a motor, as described in Japanese Laid-Open Patent Publication No. 2013-62747. In this portable device, upon rotation of the rotary shaft of the motor, a weight with an eccentric center of gravity rotates to generate vibration. This vibration allows for the vibration of the entire portable device.

SUMMARY OF THE INVENTION

In conventional portable devices including the one described in Japanese Laid-Open Patent Publication No. 2013-62747 indicated above, the proportion of the space for arranging a motor is larger than that in non-portable devices. Therefore, there is a demand for reducing the size of the vibration generating mechanism to reduce the space for the vibration generating mechanism in the portable device.

In accordance with one aspect of the present invention, a portable device is provided that includes a case having a plurality of wall portions, a battery arranged within the case, and a polymer membrane arranged between at least one of the wall portions and the battery and coupling the battery to the at least one of the wall portions. The polymer membrane has a property of changing at least one of the thickness and the length in a planar direction by being elastically deformed in response to voltage application and restoring to its original shape in response to the stoppage of the voltage application. The battery is caused to reciprocate by applying a voltage that changes periodically to the polymer membrane.

DETAILED DESCRIPTION OF THE PREFERRED EMBODIMENTS

Hereinafter, a portable device according to one embodiment will be described with reference to FIGS. 1 and 2.

Figure 1:
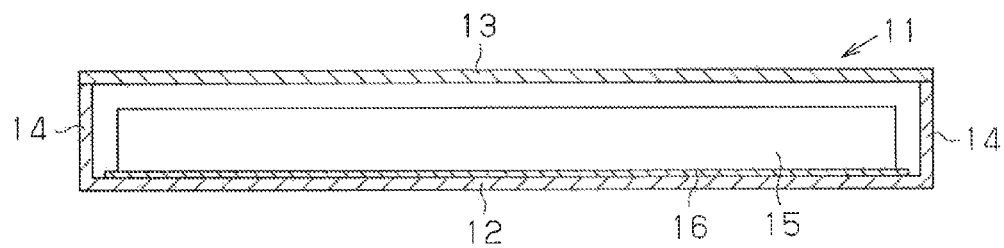
FIG. 1 is a vertical cross-sectional view of a portable device according to one embodiment.

An outer shell of a portable device is constituted by a case 11 equipped with a plurality of wall portions, as shown in FIG. 1. In this embodiment, the wall portions include a bottom wall portion 12, which constitutes the bottom portion of the case 11, an upper wall portion 13, which constitutes the upper portion thereof, and side wall portions 14, which constitute the side portions.

The case 11 accommodates a main body (not shown), which constitutes the main portion of the portable device, and a plate-like battery 15, which supplies power to the main body. The main body fulfills the original functions of the portable device (for example, talking function and communication function when the portable device is a mobile phone). The battery 15 is arranged in a state where the thickness direction of the battery 15 and the thickness direction of the bottom wall portion 12 (vertical direction in FIG. 1) are consistent with each other.

A thin polymer membrane 16 made of a polymer material is arranged between the bottom wall portion 12 and the battery 15 in the case 11. In other words, the battery 15 is indirectly placed on the bottom wall portion 12 via the polymer membrane 16. The battery 15 is spaced upward from the bottom wall portion 12 by the thickness of the polymer membrane 16. Also, the upper surface of the battery is spaced downward from the upper wall portion 13 by at least 10 µm. This gap of at least 10 µm is necessary to avoid, the battery 15 from coming in contact with the upper wall portion 13 to affect the reciprocating motion of the battery 15 when the battery 15 reciprocates in the vertical direction with changes in thickness of the polymer membrane 16, which will be described below. Further, the battery 15 is positioned in a position distant from the side wall portions 14 toward the inside of the case 11.

The polymer membrane 16 is made of a material used as a polymer actuator. Such a material includes those using a dielectric polymer and those using an ion-conductive polymer. The polymer membrane 16 employing a dielectric polymer, which is excellent in displacement, generated force, and the like, is adopted in this embodiment.

Figure 2:
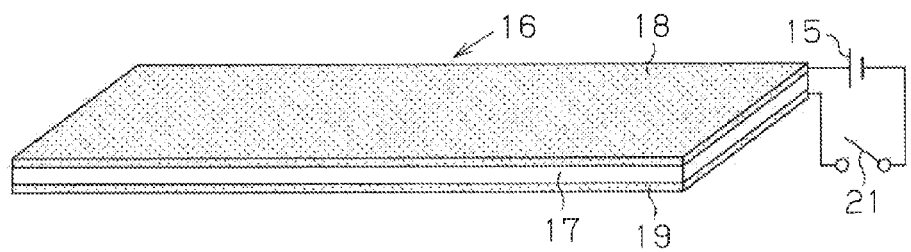
FIG. 2 is an enlarged perspective view of the structure of the polymer membrane in FIG. 1.

FIG. 2 shows the construction of the polymer membrane 16 employing a dielectric polymer. The polymer membrane 16 has a dielectric layer 17 made of an insulating polymer material having elasticity and a pair of electrodes 18, 19 each made of an electrically-conductive polymer material having elasticity, as shown in FIG. 2. The dielectric layer 17 is sandwiched between the pair of electrodes 18, 19 in its thickness direction (vertical direction in FIG. 2).

The dielectric layer 17 is made of a polymer compound such as a polymer gel having movable cross-links, for example, polyrotaxane. The polyrotaxane includes a pseudo-polyrotaxane having a structure in which a linear molecule penetrates through holes in many cyclic molecules and blocking groups bound to both terminals of the pseudo-polyrotaxane (namely, both terminals of the linear molecule) so that the cyclic molecules would not be released. For example, α-cyclodextrin is used as the cyclic molecules, and polyethylene glycol is used as the linear molecule. In contrast to this, the electrodes 18, 19 are formed, for example, by general-purpose rubber such as carbon-added silicone rubber. The electrode 18 is connected to the positive terminal of the battery 15, and the electrode 19 is connected to the negative terminal of the battery 15 via a switch 21. The opening/closing of the switch 21 is controlled by the main body of the portable device.

Upon application of voltage between the electrodes 18, 19, the dielectric layer 17 extends in its planar direction (namely, direction orthogonal to the thickness direction). With this extension, the thickness of the polymer membrane 16 reduces. When the application of voltage is stopped, the dielectric layer 17 contracts in its planar direction and restores its original shape. With this contraction, the thickness of the polymer membrane 16 increases.

As shown in FIG. 1, the polymer membrane 16 has first and second surfaces that are opposite to each other in its thickness direction. The first surface, i.e., the lower surface is fixed to the bottom wall portion 12, and the second surface, i.e., the upper surface is fixed to the battery 15. The fixing method includes adhesion by use of an adhesive or pressure-sensitive adhesive and fastening by use of a fastening tool, but is not limited thereto. By this polymer membrane 16, the battery 15 is coupled to the bottom wall portion 12. The coupling of the battery 15 to the bottom wall portion 12 via the polymer membrane 16 may be carried out by urging the battery 15 toward the polymer membrane 16 and bottom wall portion 12 (namely, from the upper side toward the lower side in FIG. 1).

Next, operation of the portable device according to this embodiment constructed in the above manner will be described.

In this portable device, when the switch 21 is closed, voltage is applied between the electrodes 18, 19. The electrode 18 is positively charged, and the electrode 19 is negatively charged.

The current flows until a predetermined quantity of electric charge is accumulated in the respective electrodes 18, 19. Once the predetermined quantity of electric charge is accumulated, almost no current flows. The sentence that "almost no current flows" means that, since some discharge occurs after the predetermined quantity of electric charge has been accumulated, a current for making up for the electric charge reduced by the discharge flows. Therefore, the advantage of less power consumed for the expansion/contraction motion of the polymer membrane 16 is obtained.

When the electrodes 18, 19 are charged in the above manner, Coulomb force, which is the force of positive charge and negative charge attracting each other, acts on the electrodes 18, 19, so that the dielectric layer 17 is pressed from both sides by the electrodes 18, 19. The dielectric layer 17, which has elasticity, extends in its planar direction when pressed from both sides in the above manner. The electrodes 18, 19, which have elasticity, extend, following the above-described extension of the dielectric layer 17. With the extension of the dielectric layer 17 and electrodes 18, 19, the thickness of the polymer membrane 16 decreases.

When the switch 21 is subsequently opened, the application of voltage between the electrodes 18, 19 ceases, so that the electric charge accumulated in the electrodes 18, 19 is released. This release of electric charge reduces the electric charge charged on the electrodes 18, 19, resulting in smaller Coulomb force. Consequently, the dielectric layer 17 contracts in the planar direction due to its own elastic restoring force. The electrodes 18, 19, which have elasticity, contract, following the contraction of the dielectric layer 17. With the contraction of the dielectric layer 17 and electrodes 18, 19, the thickness of the polymer membrane 16 increases.

The lower surface of the polymer membrane 16 is fixed to the bottom wall portion 12 of the case 11, and the upper surface thereof is fixed to the battery 15. Therefore, upon reduction in thickness of the polymer membrane 16 by elastic deformation, the battery 15 is displaced downward, namely, in a direction toward the bottom wall portion 12. Upon increase in thickness of the polymer membrane 16 by elastic restoration, the battery 15 is displaced upward, namely, in a direction away from the bottom wall portion 12.

Therefore, the battery 15 reciprocates in directions toward and away from the bottom wall portion 12 by applying a periodically changing voltage to the polymer membrane 16, so that the distance between the battery 15 and the bottom wall portion 12 periodically changes. The battery 15 functions as a weight, and the reciprocating motion of the battery 15 is transmitted to the case 11 through the polymer membrane 16, thereby vibrating the case 11. The vibration of the case 11 is transmitted to the user of the portable device through his/her palm with which the user holds the case 11.

In this embodiment, the cycle of voltage application to the polymer membrane 16 and stoppage thereof is carried out at a frequency of 20 Hz to 40 Hz. In other words, the polymer membrane 16 is applied with a voltage that changes periodically in a range of which the lower limit is 0V and at a frequency of 20 Hz to 40 Hz. Humans are apt to feel the vibration of the portable device due to the reciprocating motion of the battery 15 at this low frequency range as a vibration, and hard to sense the vibration as a sound. Hence, the vibration of the case 11 is well transmitted to the user of the portable device through his/per palm.

This embodiment utilizes the existing component, battery 15, as a weight without using a motor in the vibration generating mechanism of the portable device. Besides, the polymer membrane 16 is thin. Therefore, the space for the vibration generating mechanism in the portable device of this embodiment is smaller than that in conventional portable devices in which a weight is rotated by a motor.

Particularly, the vibration generating mechanism of this embodiment is composed of the bottom wall portion 12, the polymer membrane 16, and the battery 15, which are laminated in the thickness direction. Hence, the dimension of the vibration generating mechanism in the thickness direction of the polymer membrane 16 is further reduced.

The embodiment described in detail above provides the following advantages.

(1) The polymer membrane 16 is arranged between the bottom wall portion 12 of the case 11 and the battery to couple the battery 15 to the bottom wall portion 12 by the polymer membrane 16. The polymer membrane 16 has a property of elastically deforming in response to voltage application, and restoring its original shape in response to the stoppage thereof, so that the thickness and the length in the planar direction are both changed. The distance between the battery 15 and the bottom wall portion 12 is periodically changed by applying a voltage that changes periodically to the polymer membrane 16. Consequently, the battery 15 reciprocates in the thickness direction of the bottom wall portion 12 (FIG. 1). Therefore, the space for the vibration generating mechanism can be made smaller than that in conventional portable devices in which a weight is rotated by a motor.

(2) In the case of a vibration generating mechanism in which a weight is rotated by a motor, it is necessary to rotate the motor at a speed greater than or equal to a predetermined speed for generation of vibration. However, it takes a relatively long time to accelerate the rotation speed of the motor from standstill to the predetermined value or more, which is problematic in responsiveness. Also, it takes a relatively long time to decrease the rotation speed of the rotating motor to a predetermined value or less in order to stop the vibration, which is also problematic in responsiveness.

In contrast, upon voltage application between the electrodes 18, 19, the polymer membrane 16 immediately extends and becomes thinner, and, upon stoppage thereof or drop of the applied voltage, immediately contracts and becomes thick. Therefore, it is possible to reciprocate the battery 15 with good responsiveness to cause vibration of the case 11.

(3) The polymer membrane 16 is made of a polymer material, and thus is lighter in weight than a metallic motor. Therefore, the portable device can be made lighter. Also, since the battery 15 is used also as a weight, no weight has to be provided separately. This is also effective in reduction in weight of the portable device.

(4) The voltage applied to the polymer membrane 16 changes periodically at a frequency of 20 Hz to 40 Hz. Hence, the vibration of the case 11 is well transmitted to a user of the portable device alone through his/per palm, and the user can be notified of an incoming call or an alarm by the vibration.

(5) The bottom wall portion 12, the polymer membrane 16, and the battery 15 are laminated in their thickness direction. The lower surface of the polymer membrane 16 is fixed to the bottom wall portion 12, and the upper surface thereof is fixed to the battery 15 (FIG. 1). Therefore, the dimension of the vibration generating mechanism in the thickness direction of the polymer membrane 16 and therefore the space for the vibration generating mechanism within the portable device can be further reduced.

(6) The polymer membrane 16 has the dielectric layer 17 made of an insulating polymer material having elasticity and the electrodes 18, 19 each made of an electrically conductive polymer material having elasticity, and the dielectric layer 17 is sandwiched between the pair of electrodes 18, 19 (FIG. 2). Therefore, the dielectric layer 17 can be extended in its planar direction upon voltage application between the electrodes 18, 19, and, on the other hand, can be contracted in the planar direction and restored to its original shape upon stoppage thereof.

The above-described embodiment may be modified as follows.

A polymer membrane employing an ion-conductive polymer may be used in place of the polymer membrane 16, which employs a dielectric polymer as described above.

The polymer membrane employing an ion-conductive polymer is made up of a joined body of an ion-exchange resin and electrodes. A typical example of the polymer membrane of this type is a polymer membrane obtained by bonding an electrode including a noble metal such as gold or platinum to both surfaces of a fluorine-based ion-exchange resin membrane by electroless plating. In this polymer membrane, upon application of voltage of several volts between the electrodes, ion migration takes place within the ion-exchange resin and, specifically, positive ions migrate toward the negative electrode. This ion migration causes a difference in swelling quantity between the negative electrode side region and the positive electrode side resin of the polymer membrane, resulting in elastic deformation of the polymer membrane. Upon stoppage of voltage application, the polymer membrane restores its original shape due to elastic restoring force. Such elastic deformation and restoration enable contraction of the polymer membrane in its planar direction, so that the thickness thereof can be changed.

Thus, even if a polymer membrane employing an ion-conductive polymer is used, the battery can be caused to reciprocate by applying a voltage that changes periodically to the polymer membrane, as in the case where the polymer membrane 16 employing a dielectric polymer is used.

When the polymer membrane 16 employing a dielectric polymer is used, the dielectric layer 17 may be made of a polymer compound having movable cross-links other than polyrotaxane.

When it is desired to reciprocate the battery 15 with a larger displacement quantity, a laminate of two or more polymer membranes 16 may be used. In this case, a common electrode 18 or 19 is preferably arranged between the adjacent dielectric layers 17, from the viewpoint of reduction in thickness of the entire polymer membrane.

Figure 3:
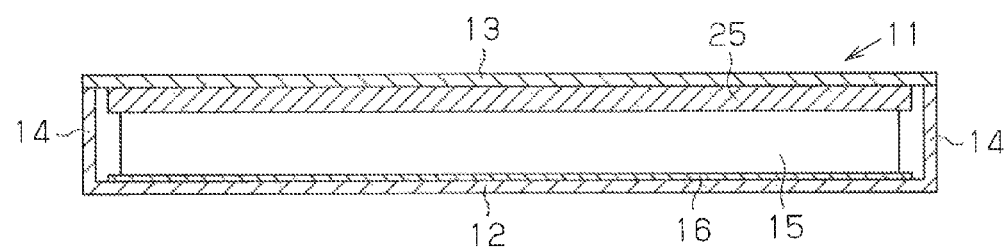
FIG. 3 is a vertical cross-sectional view showing a modification of a portable device equipped with a pressing member.

As shown in FIG. 3, a pressing member 25 made of a material having elasticity may be arranged on the side opposite to the side of the battery 15 brought into contact with the polymer membrane 16, namely, between the battery 15 and the upper wall portion 13 within the case 11. As the material for forming the pressing member 25, for example, a porous flexible material such as a sponge is suitable, but any other elastic materials may be used. The pressing member 25 presses (urges) the battery 15 toward the bottom wall portion 12. Therefore, the movable region in the thickness direction of the battery 15 during normal use (non-vibration) of the portable device is limited so that the rattling in the same direction is suppressed.

Also, the battery 15 is coupled to the bottom wall portion 12 via the polymer membrane 16 by pressing (urging) by means of the pressing member 25. Therefore, the advantage that the fixation of the polymer membrane 16 onto the battery 15 and/or case 11 can be omitted is also obtained.

In the above-described embodiment, the lower surface of the polymer membrane 16 is fixed to the bottom wall portion 12, and the upper surface thereof is fixed to the battery 15, so that the battery 15 is coupled to the bottom wall portion 12 by the polymer membrane 16. In other words, the weight of the battery 15 is received by the bottom wall portion 12 via the polymer membrane 16.

In place of this, the battery 15 may be coupled in a state where it is suspended from the wall portions such as the side wall portions 14 and upper wall portion 13 of the case 11 by the polymer membrane 16, as shown in FIGS. 4 to 7. In FIGS. 4 to 7, the main body (not shown), which constitutes the main portion of the portable device, is arranged at the back of the battery 15 within the case 11.

Figure 4:
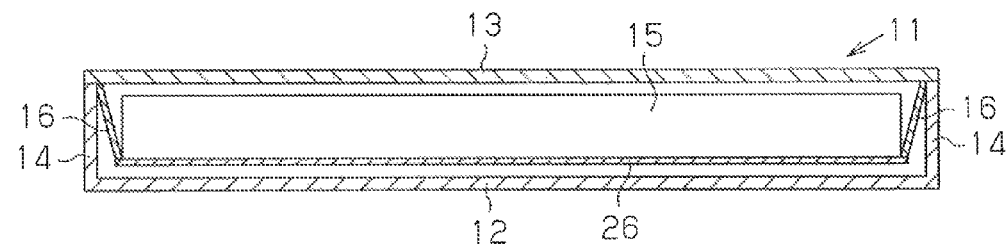
FIG. 4 is a vertical cross-sectional view showing a modification of a portable device in which a battery is suspended from side wall portions of a case by polymer membranes.

In the modification shown in FIG. 4, a support plate 26 is arranged within the case 11, and the battery 15 is fixed to this support plate 26. The support plate 26 is coupled to the side wall portions 14 by the polymer membranes 16 arranged at a plurality of positions between the side wall portions 14 of the case 11 and the battery 15, for example, at two positions opposite to each other with the battery 15 in between. The respective polymer membranes 16 tilt toward the bottom wall portion 12 so as to separate from the side wall portions 14 toward the inside of the case 11. The respective polymer membranes 16 are fixed at their lower end portion on the support plate 26, and fixed at their upper end portion on the upper end portion of the side wall portions 14. However, the respective polymer membranes 16 may be directly fixed at their lower end portion on the battery 15 without using the support plate 26.

Figure 5:
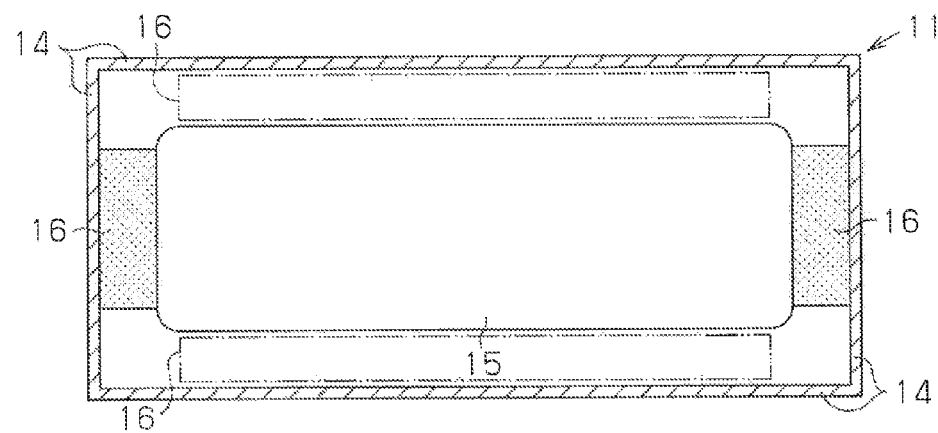
FIG. 5 is a horizontal cross-sectional view showing a modification of a portable device in which a battery is suspended from side wall portions of a case by polymer membranes provided at a plurality of positions around the battery.

FIG. 5 shows a modification of a portable device similar to the modification shown in FIG. 4. In this modification, polymer membranes 16 are arranged at a plurality of positions between the side surface of the battery 15 and the side wall portions 14 of the case 11. The battery 15 is coupled to the side wall portions 14 by these polymer membranes 16. One end of each polymer membrane 16 is fixed to the side surface of the battery 15, and the other end thereof is fixed to a side wall portion 14 opposite to the side surface of the battery 15.

The polymer membranes 16 may be arranged between any other side surface of the battery 15 and the side wall portion 14 opposite to the same side surface, for example, at a position indicated by the dash-dot-dot lines in FIG. 5, in place of, or in addition to the above-described positions.

Figure 6:
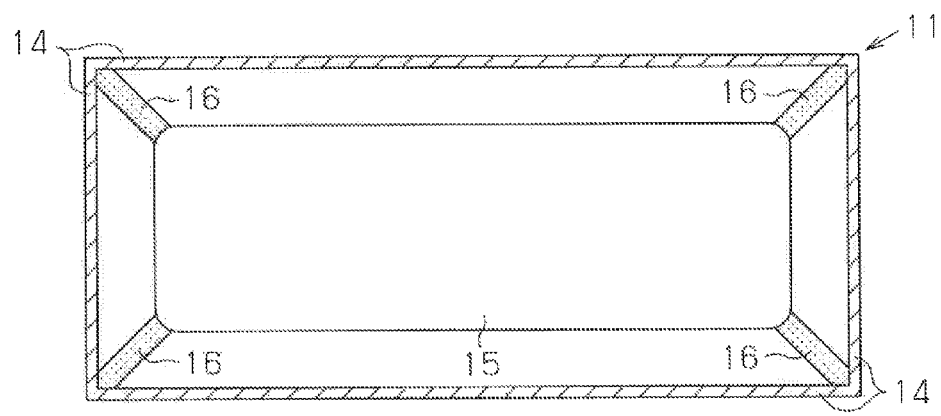
FIG. 6 is a horizontal cross-sectional view showing a modification of a portable device in which a battery is suspended from the corner portions of a case by polymer membranes provided at the four corners of the battery.

In a modification shown in FIG. 6, polymer membranes 16 are arranged between the corner portions of the battery 15 and the corner portions of the case 11, namely, the boundaries between the adjacent side wall portions 14. The battery 15 is coupled to the corner portions of the case 11 by these polymer membranes 16. One end of each polymer membrane 16 is fixed to a corner portion of the battery 15, and the other end portion thereof is fixed to a corner portion of the case 11.

Figure 7:
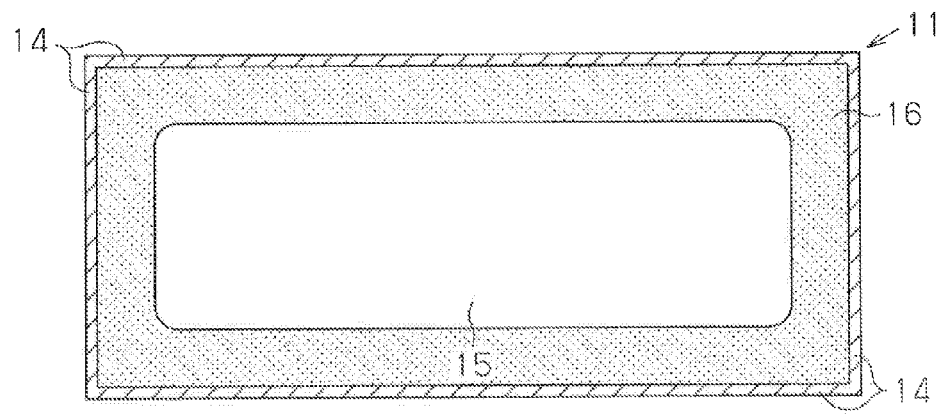
FIG. 7 is a horizontal cross-sectional view showing a modification of a portable device in which a battery is suspended from side wall portions of a case by a loop-like polymer membrane provided on the periphery of the battery.

In a modification shown in FIG. 7, the battery 15 is coupled to the side wall portions 14 of the case 11 by an approximately rectangular loop-like polymer membrane 16 arranged on the periphery of the battery 15. The inner edge of the polymer membrane 16 is fixed to all the side surfaces of the battery 15, and the outer edge thereof is fixed to all the side wall portions 14.

In all the modifications shown in FIGS. 4 to 7, the battery 15 is suspended from the wall portion such as the side wall portions 14 via the polymer membranes 16. The battery 15 reciprocates in a state where it is suspended from the wall portions, along with the elastic deformation and restoration of the polymer membrane 16. The reciprocating motion of the battery 15 can take place in the planer direction of the polymer membrane 16 in addition to the thickness direction of the polymer membrane 16. For example, in the modifications shown in FIGS. 4 to 6, it is possible to appropriately set the timings of voltage application and stoppage thereof or the cycle of periodic changes in voltage for each of the polymer membranes 16, thereby reciprocating the battery 15 in directions toward and away from the wall portions to which the battery 15 is coupled (planer direction of the polymer membranes 16). In the modification shown in FIG. 7, it is possible to reciprocate the battery 15 in the thickness direction of the polymer membranes 16 or vertical direction. Therefore, similar operation and advantages to those in the above-described embodiment are obtained also in these modifications.

Figure 8:
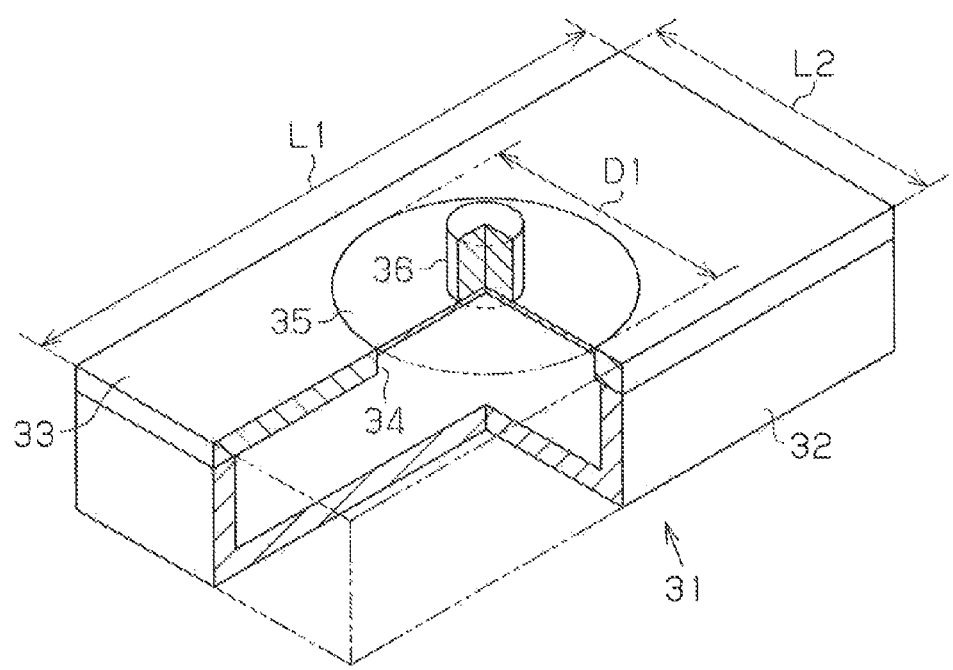
FIG. 8 is a perspective view, with a part cut away, showing a measurement device that simulates the portable device shown in FIG. 7 and is used for generation and measurement of vibration.

A measurement device 31, which simulated the portable device shown in FIG. 7, was prepared. FIG. 8 is a perspective view, with a part cut away, showing the schematic configuration of the measurement device 31. The measurement device 31 included an approximately rectangular parallelepiped case main body 32 with an open upper end and a lid portion 33 arranged on the case main body 32. The lid portion 33 had a longitudinal dimension L1 of 100 mm and a transverse dimension L2 of 50 mm. The lid portion 33 had a circular hole 34 having a diameter D1 of 40 mm, and this hole 34 was closed by a disk-shaped polymer membrane 35. The polymer membrane 35 had a dielectric layer made of polyrotaxane having a thickness of 33 μm and two electrodes made of carbon-added, electrically conductive silicone rubber having a thickness of 33 μm. The annular molecules of the polyrotaxane were α-cyclodextrin, and the linear molecule thereof was polyethylene glycol. On the center of the polymer membrane 35, a weight 36 having a weight of about 30 g was fixed with a double-sided tape. The lid portion 33, polymer membrane 35 and weight 36 of this measurement device 31 correspond to the side wall portion 14, polymer membrane 16 and battery 15, respectively, of the portable device shown in FIG. 7. This measurement device 31 was used to reciprocate the weight 36, thereby measuring the displacement quantity of the weight 36.

Specifically, with respect to both electrodes of the polymer membrane 35, the cycle of application of a voltage of 500 V and stoppage thereof was repeated at a frequency of 25 Hz to reciprocate the weight 36 in the vertical direction. The displacement quantity of the weight 36 was measured by a laser displacement gauge. As a result, the weight 36 was displaced at a frequency of 25 Hz and with an average quantity of displacement of 37 μm. When the weight 36 was reciprocated in the vertical direction in the above-described manner while the measurement device 31 was put on the palm, vibrations were felt at positions in the palm that were brought into contact with the case main body 32 and the lid portion 33.

The polymer membrane 16 shown in FIG. 1 may be arranged between the battery 15 and the upper wall portion 13 or side wall portions 14 of the case 11 to couple the battery 15 to the upper wall portion 13 or side wall portions 14.

The polymer membrane 16 may be a polymer membrane that has a property of elastically deforming in response to voltage application and restoring its original shape in response to the stoppage thereof such that only one of the thickness and the length in the planer direction is changed.

The upper and lower limits of the range of voltage that changes periodically may be set to any values as long as the difference between the upper and lower limits is able to induce reciprocation of the battery. Thus, the lower limit of the range of the periodically changing voltage does not necessarily need to be set to 0V.

The above-described portable device is widely applicable, for example, to portable devices having a vibration generating mechanism, such as mobile phones, PHSs, personal digital assistances (PDAs), tablet type PCs, portable game consoles, and controllers for game consoles.

Therefore, the present examples and embodiments are to be considered as illustrative and not restrictive and the invention is not to be limited to the details given herein, but may be modified within the scope and equivalence of the appended claims.

The invention claimed is:

1. A portable device comprising:
    a case having a plurality of wall portions;
    a battery arranged within the case; and
    a polymer membrane arranged between at least one of the wall portions and the battery and coupling the battery to the at least one of the wall portions, wherein the polymer membrane has a property of changing at least one of the thickness and the length in a planar direction by being elastically deformed in response to voltage application and restoring to its original shape in response to the stoppage of the voltage application,
    wherein the battery is caused to reciprocate by applying a voltage that changes periodically to the polymer membrane.

2. The portable device according to claim 1, wherein the periodically changing voltage changes at a frequency of 20 Hz to 40 Hz.

3. The portable device according to claim 1, wherein the periodically changing voltage is repetition of a cycle of voltage application and stoppage thereof.

4. The portable device according to claim 3, wherein the cycle of voltage application and stoppage thereof is repeated at a frequency of 20 Hz to 40 Hz.

5. The portable device according to claim 1, wherein
    one wall portion of the plurality of wall portions, the polymer membrane, and the battery are laminated in their thickness direction, and
    the polymer membrane has first and second surfaces, which are opposite to each other in its thickness direction, the first surface being fixed to the one wall portion, and the second surface being fixed to the battery.

6. The portable device according to claim 5, wherein the case further houses a pressing member that presses the battery against the one wall portion.

7. The portable device according to claim 1, wherein the battery is coupled to the at least one of the wall portions in a state where the battery is suspended from the at least one of the wall portions by the polymer membrane.

8. The portable device according to claim 1, wherein
the polymer membrane includes a pair of electrodes, each of which is made of an electrically conductive material having elasticity, and a dielectric layer, which is made of an elastic insulating polymer material and sandwiched between the electrodes, and
the polymer membrane has a property of extending in its planar direction in response to voltage application between the electrodes and contracting to restore its original shape in response to the stoppage of the voltage application.

* * * * *